Dec. 27, 1960  H. J. McSKIMIN  2,966,058
MEASUREMENT OF DYNAMIC PROPERTIES OF MATERIALS
Filed Oct. 15, 1957  2 Sheets-Sheet 1

INVENTOR
H. J. Mc SKIMIN
BY
ATTORNEY

Dec. 27, 1960 H. J. McSKIMIN 2,966,058
MEASUREMENT OF DYNAMIC PROPERTIES OF MATERIALS
Filed Oct. 15, 1957 2 Sheets-Sheet 2

ORIGINAL BALANCE

VECTOR SUM A+B= ZERO

TEST MATERIAL ON UNIT

VECTOR SUM OF A+B'= VECTOR 70

INVENTOR
H. J. Mc SKIMIN
BY
H. O. Wright
ATTORNEY

United States Patent Office 2,966,058
Patented Dec. 27, 1960

2,966,058

MEASUREMENT OF DYNAMIC PROPERTIES OF MATERIALS

Herbert J. McSkimin, Basking Ridge, N.J., assignor to Bell Telephone Laboratories, Incorporated, New York, N.Y., a corporation of New York Filed Oct. 15, 1957, Ser. No. 690,257

3 Claims. (Cl. 73—67.7)

This invention relates to improved apparatus for effecting the measurement of various characteristic dynamic properties of materials.

An object of the invention is to facilitate the accurate determination of various dynamic properties of materials.

A further object is to reduce the likelihood of error in measuring various dynamic properties of materials.

Illustrative of characteristic dynamic properties of materials which can be accurately measured in accordance with the principles of the present invention are the elasticity and viscosity of liquids at ultrasonic frequencies and the characteristic impedance of various liquids and solids at ultrasonic frequencies. It should be noted that the dynamic or high frequency characteristics of numerous materials are very materially different from their "static" or low frequency characteristics.

Particular illustrative arrangements of the present invention described in the present application represent improvements over an arrangement disclosed and described in an article, entitled "Measurement of Shear Elasticity and Viscosity of Liquids at Ultrasonic Frequencies," by W. P. Mason, W. O. Baker, J. H. Heiss, and applicant, published in the Physical Review, volume 75, for 1949, starting at page 936. See particularly Fig. 10 of said article at page 942 and the description thereof. As illustrated in Fig. 10 of said article, two identical fused silica rods were employed to transmit ultrasonic frequency acoustic wave energy over identical paths in the respective rods. The rods each had a highly polished horizontal upper surface, hereinafter referred to as a testing surface, upon which a material to be tested could be placed. Transverse or shear wave energy was employed having a particle motion parallel to the testing surface to provide maximum shear wave coupling with the test material. After their respective response characteristics had been carefully balanced with each other, the material, the characteristics of which were to be determined, was placed on the testing surface of one of these rods. Unbalance in amplitude and phase resulting from adding the material to be tested to one rod only was employed, as described in detail in the article, to deduce at ultrasonic frequencies the dynamic shear elastivity and the dynamic viscosity of the liquid added. In order to realize the degree of accuracy required, however, it is essential to maintain both fused silica rods at precisely the same temperature to within an accuracy of greater than one-hundredth of a degree for a sufficient time interval to permit the circuit to be balanced and complete data for the material under test to be obtained.

A feature of the present invention is the elimination of the necessity for such extremely close temperature control of the acoustic transmission medium.

This is achieved by use of a single acoustic transmission rod (of fused silica or the like) through which two acoustic wave energy signals may be transmitted along two closely positioned and otherwise similar paths, respectively (or in one embodiment even along the same identical path for both signals), in such manner that one signal only is subjected to the influence of the liquid, or other material, the dynamic characteristics of which are to be measured.

Other features of the present invention are the provision of improved circuits and methods of obtaining the data required.

Other and further objects, features and advantages of the invention will become apparent from a perusal of the following detailed description of specific illustrative embodiments employing various principles of the invention and from the appended claims.

In the accompanying drawings:

Fig. 3 illustrates in diagrammatic form a simple arrangement of geometrical relations which will afford equal length paths for acoustic wave energy in a single block of fused silica, or the like;

Figure 4A:
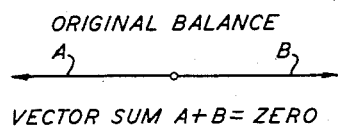
Figure 4B:
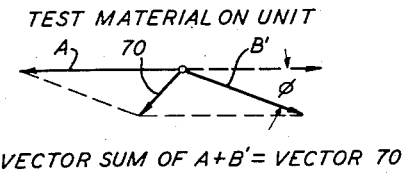
Figure 4B:
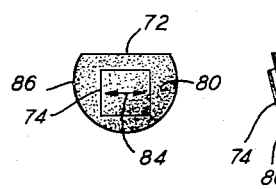
Figure 4B:
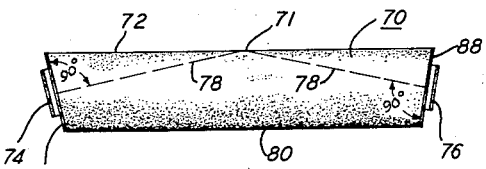
Figure 4B:
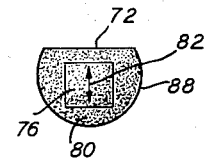

Figs. 4A and 4B comprise vector diagrams illustrative of the phase and amplitude relations developed in accordance with the invention; and Figs. 5A, 5B and 5C illustrate a further form of electroacoustic unit for use in practicing principles of the invention.

Figure 1:
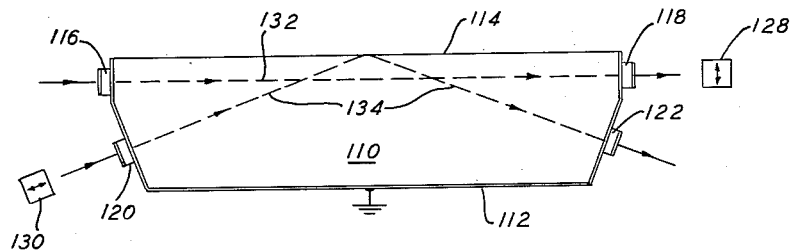
Fig. 1 illustrates a simple form of electroacoustic unit for use in circuits of the invention.

In more detail in Fig. 1, a simple form of electroacoustic device or unit is illustrated which embodies salient features of the invention.

The device includes a block 110 of a material such as fused silica which will readily transmit ultrasonic wave energy and has a highly polished flat upper surface 114. The other surfaces of block 110 have a conductive coating 112 which can, for example, be a thin metallic deposit. This coating serves to electrically ground these surfaces of the block and also as one electrode of each of the four transducers to be described presently.

Electroacoustic transducers 116 and 118, which are adapted to convert electrical wave energy into acoustic wave energy and vice versa, are situated on opposite parallel surfaces of block 110 perpendicular to surface 114, as shown, so that if appropriate electrical wave energy is, for example, applied to transducer 116, it will generate acoustic wave energy which will travel along path 132 to transducer 118 which will convert the acoustic energy back into electrical energy.

Similarly, transducers 120 and 122 are located on symmetrically located inclined surfaces so that electrical wave energy applied to transducer 120 will cause acoustic wave energy to traverse path 134, the energy being directed, as shown, to impinge upon surface 114 at an acute angle and upon reflection from surface 114 to be directed to transducer 122 which will convert the acoustic energy back into electrical energy.

Transducers 116, 118, 120 and 122 are preferably of the quartz crystal type adapted to generate and respond to transverse (shear) ultrasonic waves in which the particle motion is linear and perpendicular to the direction of propagation of the wave. A number of suitable types of transducers are well known to those skilled in the art. For example, they may be quartz crystals of the well known Y-cut or AT-cut types. The particle motion of the waves generated and/or efficiently received by transducers 116 and 118 is preferably perpendicular to the surface 114 as indicated by the arrow of the symbol 128 to the right of transducer 118. The particle motion of the waves generated and/or efficiently received by transducers 120 and 122 is parallel to the surface 114, as indicated by the arrow of the symbol 130 adjacent to the transducer 120. This is a necessary condition to obtain effective coupling between the acoustic waves generated by transducer 120 and a material such, for example, as a liquid placed on surface 114 for determination of its dynamic shear viscosity and shear elasticity. Symbols 128 and 130 are in effect plan views of the outer surfaces of their respective transducers, the arrows being added to indicate the direction of particle motion of the acoustic waves directed along paths 132 and 134, respectively. Each transducer has a metallic coating on its outer surface to serve as one electrode and employs the metallic coating 112 on all surfaces of block 110 (except the top surface 114) as its other electrode, as mentioned hereinabove.

It will be apparent to those skilled in the art that the unitary arrangement shown in Fig. 1 and described in detail immediately above can be substituted for the two separate identical electroacoustic devices employed in the circuit of Fig. 10 of the above-mentioned article by Mason et al. Obviously, with the unitary arrangement of Fig. 1, both paths will be similarly affected by small changes in temperature of the single acoustic transmission member and the objectionable feature of having to maintain two physically separated devices at precisely the same temperature to an extremely high degree of precision and for an appreciable interval of time, as explained hereinabove, is eliminated.

The device of Fig. 1 can, however, be still further simplified by omitting the output or receiving transducers 118 and 122 and employing energy pulses of sufficiently short duration and sufficiently low repetition rate that each pulse can travel over the paths 132 and 134, respectively, and be reflected back from the surfaces previously occupied by transducers 118 and 122, respectively, to transducers 116 and 120 before the next successive pulse is to be transmitted. This simplification of the acoustic unit and appropriate circuits for use with the simplified unit are illustrated diagrammatically in Fig. 2 which will be described next.

Figure 2:
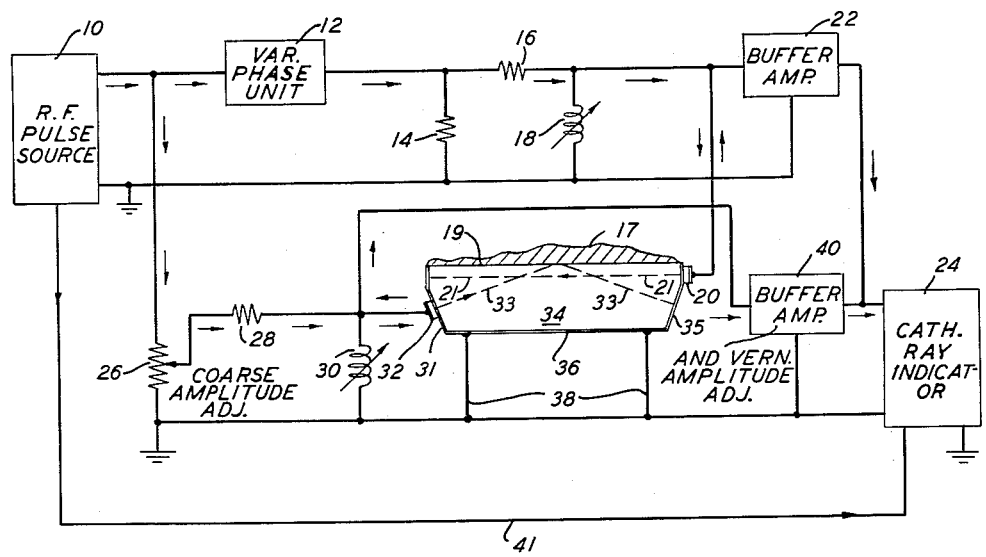
Fig. 2 illustrates in block schematic diagram form a circuit arrangement of the invention.

In Fig. 2, a salient feature is a fused silica rod 34 which has a first electroacoustic wave transducer 20 fastened thereto by any of the several conventional manners well known in the art. In response to an electrical energy pulse, from source 10, transducer 20 will send an acoustic wave energy pulse along path 21 in rod 34 to strike a surface opposite and parallel to that upon which transducer 20 is mounted. The energy pulse will therefore be reflected back along path 21 and strike transducer 20 causing the latter to generate a corresponding electrical energy "echo" pulse. In a similar manner, a second electroacoustic transducer 32 is mounted on an inclined end surface 31 of rod 34 and in response to an electrical energy pulse, from source 10, will transmit an acoustic wave energy pulse along path 33 striking the upper surface 19 of rod 34 and being reflected therefrom along a second section of path 33, as shown, to strike surface 35 perpendicularly. Surface 35 will therefore reflect the acoustic pulse back along path 33 and by a second reflection at surface 19 back to the second transducer 32, whereupon transducer 32 will emit a corresponding electrical energy "echo" pulse. Because of being twice reflected by surface 19, the waves traversing path 33 will be, of course, twice subjected to the influence of a test material 17 when it is placed on surface 19. As mentioned above for the transducers of Fig. 1, transducers 20 and 32 of Fig. 2 are adapted to transmit and/or receive shear waves having transverse linear particle motion. The particle motion of the waves generated by transducer 32 should be parallel to surface 19 and that of the waves generated by transducer 20 are preferably perpendicular to surface 19.

Figure 3:
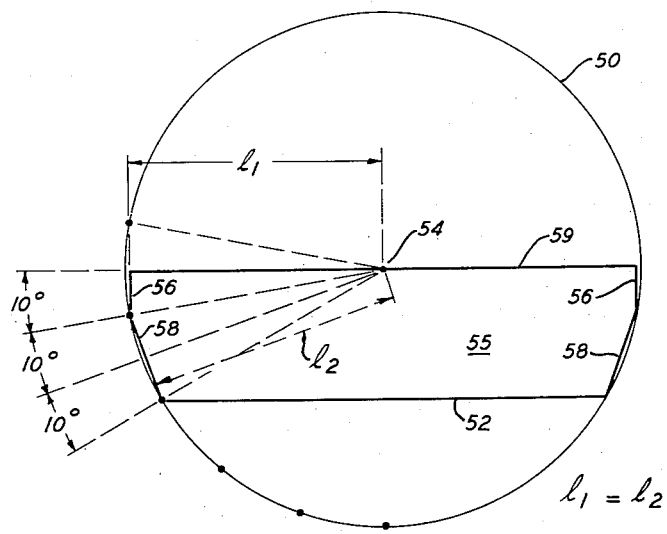

As will be demonstrated in detail in connection with the description of Fig. 3, given below, rod 34 can be readily designed so that path 21 will be of exactly the same length as path 33 (both parts) so that if electrical pulses are simultaneously applied to transducers 20 and 32, reflected or echo pulses will arrive back at said transducers simultaneously.

As a further alternative, which will be described in detail in connection with Fig. 5 hereinbelow, the rod 34 can be designed so that the two pulses can be transmitted over the same acoustic path but in opposite directions and with shear waves having orthogonally related linear transverse particle motions, as described in connection with Fig. 1 hereinabove. Again, the two "echo" pulses will arrive back at their respective transducers simultaneously and the differential effect between the two paths can be employed to determine the dynamic properties of the test material on the testing surface.

Numerous and varied other modifications and rearrangements of the acoustic transmission unit will readily occur to those skilled in the art, the above being, obviously, illustrative of only a few of numerous possible arrangements.

Whichever of the above-mentioned specific designs of acoustic transmission medium and arrangements of transducers is employed, the echo pulses can be compared and circuit adjustments made to substantially balance the outputs derived from the two acoustic paths before the material 17 to be analyzed is placed on the surface 19.

Unbalance in phase and attenuation resulting from placing material 17 on surface 19 can then be employed to determine specific properties of the material 17 such as its elasticity, viscosity and the like, substantially as taught, for example, in the article by Mason et al. in the Physical Review mentioned hereinabove.

The diagrammatic circuit of Fig. 2, including the elements 20, 32 and 34, just described, represents one specific illustrative circuit arrangement whereby suitable electrical input energy pulses can be applied to transducers 20 and 32 and "echo" pulses returning to the transducers can be compared to first balance the circuit (prior to placing material 17 on surface 19) preparatory to making observations, and then for making the requisite observations after the material 17 has been placed on surface 19.

In Fig. 2, a radio frequency pulse source 10 supplies pulses which, for example, may comprise pulses having a duration of ten microseconds, a carrier frequency in the order of forty megacycles and a repetition rate of 1000 times a second.

These pulses are impressed upon transducer 20 through the circuit portion which includes the variable phase unit 12 and the impedance network combination of shunt resistor 14 and series resistor 16, as shown. An adjustable inductor 18 is shunted across the transducer 20 and is employed to tune out or resonate the input capacity of the transducer 20 and the input capacity of amplifier 22 at the carrier frequency of the pulses.

It should be noted that all surfaces of the acoustic member 34 except for its upper surface 19 have a thin metallic layer deposited on them, this layer constituting a ground connection through leads 38 and, as well, providing one electrode plating (the inner one) for each of the transducers 20 and 32. The outer surfaces of transducers 20 and 32 are, of course, provided with conductive coatings to serve as their other electrodes, respectively.

Pulses from source 10 are also impressed upon transducer 32 through the coarsely adjustable impedance network combination of potentiometer 26 connected in shunt and series resistor 28, which latter is connected to the adjusting arm of potentiometer 26 as shown. An adjustable inductor 30 is shunted across transducer 32 to tune out or resonate the input capacity of transducer 32 and the input capacity of amplifier 40 at the carrier frequency of the pulses.

While the impedance of the input circuits from source 10 to the shunting resistances 14 and 26 is quite low, for example, fifty ohms, the impedance to the right of series resistances 16 and 28, respectively, is relatively substantially higher, for example, 2500 ohms, so that reflected acoustic pulses arriving back at their respective transducers 20 and 32, as described in detail hereinabove, will in the main be directed to the buffer amplifiers 22 and 40, respectively, and insignificant energy of the reflected pulses will be lost to the input circuits. This arrangement also has the advantage of preventing any appreciable "feedback" of an "echo" pulse from either input circuit to the other.

Buffer amplifiers 22 and 40, as their name indicates, in addition to amplifying the echo pulses prevent energy from the output of either amplifier returning to either of the transducer circuits just described. Amplifier 40, in addition, includes a vernier amplitude adjustment to facilitate accurate amplitude adjustment to assist in effecting the appropriate overall circuit conditions before and after the material 17 has been placed on the surface 19. Prior to placing material 17 on surface 19, the phase unit 12 and the relative amplitudes of the two transducer circuits are adjusted to a precise balance indicated by reduction of the combined outputs of amplifiers 22 and 40 to zero. After placing material 17 on surface 19, other adjustments of phase and amplitude are made, as will be described in detail hereinunder, to facilitate interpretation of the results obtained.

The paralleled outputs of amplifiers 22 and 40 are, as just stated, connected to an indicator 24. This indicator can conveniently be, for example, a cathode ray oscilloscope, the horizontal sweep of which is synchronized by pulses from source 10 over lead 41. Any difference between the two "echo" pulses from amplifiers 22 and 40 will, of course, appear as a pulse on the trace of oscilloscope 24, and by appropriate adjustment of phase unit 12 and amplitude adjustments 26 and the vernier adjustment of amplifier 40, the pulse can be reduced to zero.

After an exact balance (zero net output) has been effected, the material 17 to be tested is placed on surface 19 and by reaction with the waves from transducer 32 will normally produce an imbalance in both amplitude and phase. Further appropriate adjustment of the phase unit 12 and the amplitude adjustment of amplifier 40 to again produce an exact balance will indicate the change in phase and amplitude resulting from placing the test material on the test surface. This matter will be more readily understood from the vector diagrams of Figs. 4A and 4B described in detail hereinunder.

In Fig. 3, one simple method of designing a unit such as unit 34 of Fig. 2 to make the two paths 21 and 33 of Fig. 2 equal in length is illustrated. A circle 50 is circumscribed about the outline of an element 55, corresponding to element 34 of Fig. 2, the center 54 of circle 50 being the midpoint of the upper surface 59 of element 55. It is then apparent from inspection that if the upper surfaces 56 and the lower surfaces 58 at each end of unit 55 lie on chords which intercept equal successive angles (twenty degree angles are illustrated) on the circumference of said circle, as shown, the half paths $l_1$ and $l_2$ will be equal in length and consequently the whole paths will likewise be equal.

Turning now to the vector diagrams of Figs. 4A and 4B, vector A represents the output or echo pulse from, for example, reproducer 20 of Fig. 2, after amplification in buffer amplifier 22. Since this pulse follows path 21 which does not impinge upon surface 19, it will not be affected by the placing of the material 17 to be tested upon the surface 19. Accordingly, it appears with precisely the same phase angle and is of the same length (amplitude) in Fig. 4B as in Fig. 4A.

As indicated by the titles above these diagrams, Fig. 4A represents the original balance, that is, the balance obtained prior to placing the material or liquid to be tested upon the surface 19 of Fig. 2, for example, and Fig. 4B represents the unbalance introduced by placing the material 17 to be tested upon surface 19. Vector B as shown in Fig. 4A is originally adjusted to be precisely out of phase (i.e. in phase opposition) and of precisely equal amplitude with vector A (indicated by the reduction of the difference pulse on oscilloscope 24 to zero, as expressed by the relation $A+B=0$).

Vector B' of Fig. 4B represents the effect upon vector B of placing the material 17 on the surface 19, namely, vector B' is somewhat shorter than vector B (i.e. it has been attenuated somewhat) and is displaced in phase by an angle $\Phi$ with respect to the position of phase opposition with vector A. The resultant, or vector sum, of $A+B'$ is not zero but is vector 70. Now, obviously, if phase unit 12 and the vernier amplitude adjustment of amplifier 40 are adjusted to reduce the vector sum of vectors $A+B'$ to zero, the change in phase unit 12 required will be a measure of the angle $\Phi$ and the change in the amplitude adjustment of amplifier 40 required will be a measure of the attenuation which resulted in changing vector B to vector B'. With these quantities accurately known, the viscosity and elasticity of the material 17 can be accurately determined as taught, for example, in the above-mentioned article by W. P. Mason et al.

In Figs. 5A, 5B and 5C, a further alternative form of acoustic unit 70 of the invention is illustrated which can be employed in the circuit of Fig. 2 in place of unit 34.

In the arrangement of Figs. 5A, 5B and 5C, a fused silica rod or bar 70 of substantially circular cross section, except for a flat upper surface 72, has ends 86 and 88 equally inclined with respect to the longitudinal axis of the rod so that normals to their respective midpoints intersect at the midpoint 71 of the upper flatted surface 72 of rod 70, as shown. Transducers 74 and 76 are centrally mounted on surfaces 86 and 88, respectively, as shown in more detail in end views of Figs. 5B and 5C, respectively, and each will project acoustic wave energy along the path 78 (both portions), the energy being reflected by the opposite end back along both portions of path 78 to the transducer at which it originated.

The acoustic waves emitted by transducers 74 and 76 are again transverse shear waves, the particle motions of which are orthogonally related, one being parallel to surface 72, the other being substantially perpendicular to surface 72, as indicated by arrows 82 and 84 in the end views of Figs. 5C and 5B, respectively. The differential effect upon the waves generated by transducer 74 and those generated by transducer 76 can then be employed to determine the dynamic properties of a material or liquid placed upon the surface 72. The transducers 74 and 76 can be of any of several types well known to those skilled in the art as transverse or shear wave mode transducers, particularly suitable types being those known as Y-cut and AT-cut quartz crystal transducers. Since the waves of the two transducers 74 and 76 traverse precisely the same path in the element 70, the unit of Figs. 5A, 5B and 5C is extremely stable with temperature variations.

All surfaces of unit 70 except the upper surface 72 are coated with a thin conductive coating to act as a ground connection for the unit and as one electrode of each of the transducers 74 and 76.

Obviously, the unit illustrated in Figs. 5A, 5B and 5C can be substituted in Fig. 2 for unit 34 and transducers 20 and 32 and the overall operation of the circuit of Fig. 1 will not be appreciably changed except for a somewhat further increase in stability with changes in temperature.

Numerous diverse and varied arrangements within the spirit and scope of the principles of the present invention can readily be devised by those skilled in the art. No attempt to exhaustively illustrate all such possibilities has been made.

What is claimed is:

1. An electroacoustical system for use in determining various dynamic characteristics of materials, comprising a block of material which freely transmits ultrasonic wave energy, said block having a highly polished surface upon which materials to be tested can be placed, a first means for directing ultrasonic shear wave energy over a first path through said block to impinge upon said surface and be reflected therefrom, the particle motion of the shear wave energy being parallel to the polished surface, means for receiving said energy after it has traversed said path, a second means for directing ultrasonic shear wave energy over a second path through said block, the second path being spaced from said substantially parallel to the polished surface, means for receiving said energy after traversing said second path, said first and second paths being of substantially the same length and traversing portions of said block which are in close physical proximity to each other, and means for comparing the amplitude and phase of the energy waves which have traversed said first path with the amplitude and phase of the energy waves which have traversed said second path both without and with a material to be tested on said surface whereby particular dynamic properties of said material can be determined and changes in the temperature of the block will equally affect transmission over both paths.

2. An electroacoustic unit for use in a system for determining various dynamic properties of materials, comprising an element of ultrasonic wave energy transmitting material, said element including a surface upon which materials to be tested can be placed, a first means for transmitting a first ultrasonic energy shear wave through said element to impinge upon said surface at an acuate angle, the particle motion of said shear wave being parallel to said surface, means for receiving said wave after reflection from said surface, a second means for transmitting a second ultrasonic energy shear wave through said element over a path through said element identical in length and in position within said element to the path of said first wave, the particle motion of said second wave being perpendicular to that of said first wave, and means for receiving said second wave after it has traversed its assigned path, whereby comparison of the relative phases and amplitudes of said received waves, with no material on said surface and with a material to be tested placed on said surface, will yield data from which particular dynamic characteristics of the test material can be ascertained and changes in the temperature of the element will equally affect the transmission of both shear waves.

3. An electroacoustic unit for use in determining various dynamic properties of materials, comprising an element of ultrasonic wave energy transmitting material, said element including a surface upon which materials to be tested can be placed, first and second transducers for transmitting acoustic shear waves through said element to impinge at like acute angles upon said test surface, the wave from each transducer also impinging perpendicularly upon and being reflected from a surface of the other transducer, the particle motion of the waves transmitted by said first transducer being parallel to said test surface and perpendicular to that of the waves transmitted by said second transducer, said waves traversing the same path through said element, and means responsive to electrical energy generated by said transducers when reflected acoustic shear wave energy of appropriate orientation impinges upon the transducers, respectively, for receiving reflections of each of said waves from said surface whereby comparison of said reflected waves in relative phase and amplitude will yield data from which particular dynamic properties of a material placed on said testing surface can be determined and changes in the temperature of the element will equally affect the transmission of both shear waves.

References Cited in the file of this patent

UNITED STATES PATENTS 2,618,968     McConnel     Nov. 25, 1952